(12) United States Patent
Gorkavyi et al.

(10) Patent No.: US 11,198,218 B1
(45) Date of Patent: Dec. 14, 2021

(54) MOBILE ROBOTIC SYSTEM AND METHOD

(71) Applicants: Nick Gorkavyi, Haymarket, VA (US); Mikhail Fedorov, Cerritos, CA (US)

(72) Inventors: Nick Gorkavyi, Haymarket, VA (US); Mikhail Fedorov, Cerritos, CA (US)

( * ) Notice: Subject to any disclaimer, the term of this patent is extended or adjusted under 35 U.S.C. 154(b) by 322 days.

(21) Appl. No.: 16/448,410

(22) Filed: Jun. 21, 2019

Related U.S. Application Data

(60) Provisional application No. 62/690,386, filed on Jun. 27, 2018.

(51) Int. Cl.
| | |
|---|---|
| *B62D 61/12* | (2006.01) |
| *B25J 9/16* | (2006.01) |
| *B25J 19/02* | (2006.01) |
| *G05D 1/02* | (2020.01) |
| *B25J 5/00* | (2006.01) |
| *G06T 7/00* | (2017.01) |

(52) U.S. Cl.
CPC ............. *B25J 9/1664* (2013.01); *B25J 5/007* (2013.01); *B25J 9/1674* (2013.01); *B25J 19/02* (2013.01); *B62D 61/12* (2013.01); *G05D 1/0251* (2013.01); *G05D 1/0272* (2013.01); *G06T 7/97* (2017.01); *G05D 2201/0217* (2013.01)

(58) Field of Classification Search
CPC ............... A46B 13/001; A47L 2201/00; A47L 2201/04; A47L 5/22; A47L 9/0477; G05D 1/0219; G05D 1/0227; G05D 1/0234; G05D 1/0242; G05D 1/0244; G05D 1/0255; G05D 1/0272; G05D 1/0274; G05D 2201/0203; G05D 2201/0208; G05D 2201/0215; G05D 1/021; Y10S 901/01; Y10S 901/28; Y10S 901/03; Y10S 901/27; Y10S 901/31; Y10S 901/46; Y10S 901/47; B25J 19/02

See application file for complete search history.

(56) References Cited

U.S. PATENT DOCUMENTS

| | | | | |
|---|---|---|---|---|
| 6,658,325 | B2 * | 12/2003 | Zweig | B25J 9/1689 318/568.1 |
| 6,668,211 | B1 * | 12/2003 | Fujita | G05B 19/0426 700/245 |
| 6,671,582 | B1 * | 12/2003 | Hanley | B25J 5/007 700/245 |
| 7,096,090 | B1 * | 8/2006 | Zweig | G05D 1/0022 700/245 |
| 7,174,238 | B1 * | 2/2007 | Zweig | G05D 1/0038 700/245 |

(Continued)

OTHER PUBLICATIONS

Duan et al., Mobit, A Small Wheel—Track—Leg Mobile Robot, 2006, IEEE, p. 9159-9163 (Year: 2006).*

(Continued)

*Primary Examiner* — Mcdieunel Marc
(74) *Attorney, Agent, or Firm* — P. Jeff Martin; The Law Firm of P. Jeffrey Martin, LLC

(57) ABSTRACT

A robotic system and method having a movable and adjustable platform with a plurality of vertically-adjustable legs depending from the platform, the legs having wheels for moving and turning, and a plurality of sensors incorporated with a 3-D model program and movement algorithm that utilizes the information and data collected by the sensors for directing the motors and controls units to move and adjust the robotic system and the system device provided herein.

14 Claims, 7 Drawing Sheets

(56) References Cited

U.S. PATENT DOCUMENTS

| | | | | |
|---|---|---|---|---|
| 7,603,199 | B2 * | 10/2009 | Takenaka | B62D 57/032 |
| | | | | 180/65.1 |
| 7,620,477 | B2 * | 11/2009 | Bruemmer | G06N 3/008 |
| | | | | 180/167 |
| 7,668,621 | B2 * | 2/2010 | Bruemmer | G05D 1/0223 |
| | | | | 700/245 |
| 7,769,490 | B2 | 8/2010 | Abramson et al. | |
| 8,855,813 | B2 | 10/2014 | Ziegler et al. | |
| 9,591,902 | B1 | 3/2017 | Hyde et al. | |
| 2003/0120389 | A1 | 6/2003 | Abramson et al. | |
| 2016/0059412 | A1 | 3/2016 | Oleynik | |
| 2017/0182657 | A1 | 6/2017 | Rose et al. | |
| 2018/0224853 | A1 * | 8/2018 | Izhikevich | G01C 21/20 |

OTHER PUBLICATIONS

Fuchs et al., Rollin' Justin—Design considerations and realization of a mobile platform for a humanoid upper body, 2009, IEEE, p. 4131-4137 (Year: 2009).*

Sorin et al., Matlab simulation interface for locomotion analysis of a hexapod robot structure, 2012, IEEE, p. 1-6 (Year: 2012).*

Burkus et al., Autonomous Hexapod Walker Robot "Szabad(ka)", 2007, IEEE, p. 103-106 (Year: 2006).*

* cited by examiner

MOBILE ROBOTIC SYSTEM AND METHOD

I. RELATED APPLICATIONS

This application claims priority to U.S. Provisional Patent Application No. 62/690,386, filed on Jun. 27, 2018, the disclosure of which is hereby incorporated by reference in its entirety.

II. FIELD OF THE INVENTION

The present application discloses and describes a robotic system and method, wherein the robotic system includes a system device having a movable and adjustable platform for deploying various components.

III. BACKGROUND

Many apparatuses, systems, and methods have been attempted to provide robotic systems that independently move within a space having a non-flat or irregular surface and deploy means for achieving certain outcomes, including cleaning hard-to-reach items and areas, navigating heights for those with physical difficulties and/or disabilities, and the like.

Accordingly, there is a need for an affordable apparatus, system, and/or method that provides a robotic system and method that incorporates sensors, controls, and software and hardware that provides a robotic system and method that detects and maneuvers in relation to static and dynamic objects.

A search of the prior art did not disclose any patents that read directly on the claims of the instant invention; however, the following references were considered related:

U.S. Patent Publication No. 2017/0182657 A1, published in the name of Rose et al.;

U.S. Patent Publication No. 2016/0059412 A1, published in the name of Oleynik;

U.S. Pat. No. 7,769,490 B2, issued in the name of Abramson et al.;

U.S. Pat. No. 9,591,902 B1, issued in the name of Hyde et al.;

U.S. Patent Publication No. 2003/0120389 A1, published in the name of Abramson et al.; and U.S. Pat. No. 8,855,813 B2, issued in the name of Ziegler et al.

IV. SUMMARY OF THE INVENTION

This application presents claims and embodiments that fulfill a need or needs not yet satisfied by existing devices, apparatuses, systems, inventions and methods previously or presently available or disclosed. In particular, the claims and embodiments disclosed herein describe a robotic system, the robotic system comprises a platform having a minimum length equal to approximately twice the expected length of an interior stair-step, the platform having a front bumper and a rear bumper; a plurality of legs depending from the platform wherein each leg includes at its end a leg with one or more wheels, the plurality of legs include fixed, non-extensible legs adjacent the front bumper of the platform and at least three vertically-extensible legs including one leg adjacent the rear bumper of the platform and at least two legs disposed between the front and the rear bumper; a plurality of electric motors controlling movement of the plurality of legs and wheels; and a three-dimensional model program and a movement algorithm utilizing a plurality of sensors collecting and processing data for controlling the movement of the platform, the plurality of sensors comprises a multi-planar lidar disposed on the platform; a plurality of proximity sensors disposed on the front bumper, the rear bumper, and the plurality of legs; a plurality of weight sensors disposed on the plurality of legs; a plurality of turning sensors disposed on the plurality of wheels; a plurality of vertical positioning sensors disposed on the plurality of legs; and a tilt sensor disposed on the platform, the robotic system provides unanticipated and nonobvious combination of features distinguished from the devices, apparatuses, systems, inventions and methods preexisting in the art. The applicants are unaware of any apparatus, device, system, method, disclosure or reference that discloses the features of the claims and embodiments disclosed herein, and as more fully described below.

In another embodiment, a robotic system comprises a platform having a length equal to approximately twice an expected length of an interior stair-step, the platform having a front bumper and a rear bumper. The system also includes a plurality of pairs of legs depending from the platform wherein each pair of legs includes a pair of wheels, the plurality of legs connected on the end by an axis that includes mutually opposed wheels, the plurality of axes comprising a fixed pair of front legs adjacent the front bumper of the platform, a vertically-extensible pair of rear legs adjacent the rear bumper of the platform, and at least two vertically-extensible pairs of intermediate legs disposed between the front legs and the rear legs. The system also includes a plurality of electric motors controlling movement of the plurality of legs and wheels, a three-dimensional model program and a movement algorithm utilizing a plurality of sensors collecting and processing data for controlling the movement of the platform, the plurality of sensors comprising: a multi-planar lidar disposed on the platform, a plurality of proximity sensors disposed on the front bumper, the rear bumper, and the plurality of legs, a plurality of weight sensors disposed on the plurality of legs, a plurality of turning sensors disposed on the plurality of wheels, a plurality of vertical positioning sensors disposed on the plurality of legs, and a tilt sensor disposed on the platform.

A robotic system and method having a movable and adjustable platform adapted and configured to independently move about and through a multi-level structure having stairs and steps. The platform includes a plurality of legs depending from the platform, the legs ending with axes having wheels for moving and turning.

In accordance to one embodiment, the system is guided by a means for collecting and analyzing data concerning the proximal/immediate environment or geography of the system, a means for processing the analyzed data, and means for generating a 3D model thereof based upon the data collected and analyzed. In accordance to one embodiment, the means for generating a 3D model of the proximal/immediate environment may comprise multi-planar lidar, the 3D model being continuously or frequently updated. Thus, the system and/or method may be guided by: (i) a multi-planar lidar-based three-dimensional (3-D) data collection and analysis of the surrounding environment; and (ii) a 3-D model program of the environment with continuous or frequent updates of the data via the lidar sensor(s).

The system may further comprise a plurality of sensors incorporated with a 3-D model program and movement algorithm that utilizes the information and data collected by the sensors for directing the motors and controls units to move and adjust the robotic system and the system device, thereby actuating the platform to move, turn, stop, and tilt about any number of planes and orientations.

V. BRIEF DESCRIPTION OF THE DRAWING(S)

FIG. 1 is a side view of a general embodiment of a robotic device described herein;

FIG. 2 is a schematic illustrating the cooperative relationship of the control unit 20, the 3-D model program 30 and the movement algorithm 300, as well as the utilization of sensors 200 for collecting information and data;

FIG. 3 is an illustration of a robotic device deployed on stairs to be used for cleaning or the like;

VI. DESCRIPTION OF THE EMBODIMENT(S)

Figure 1:
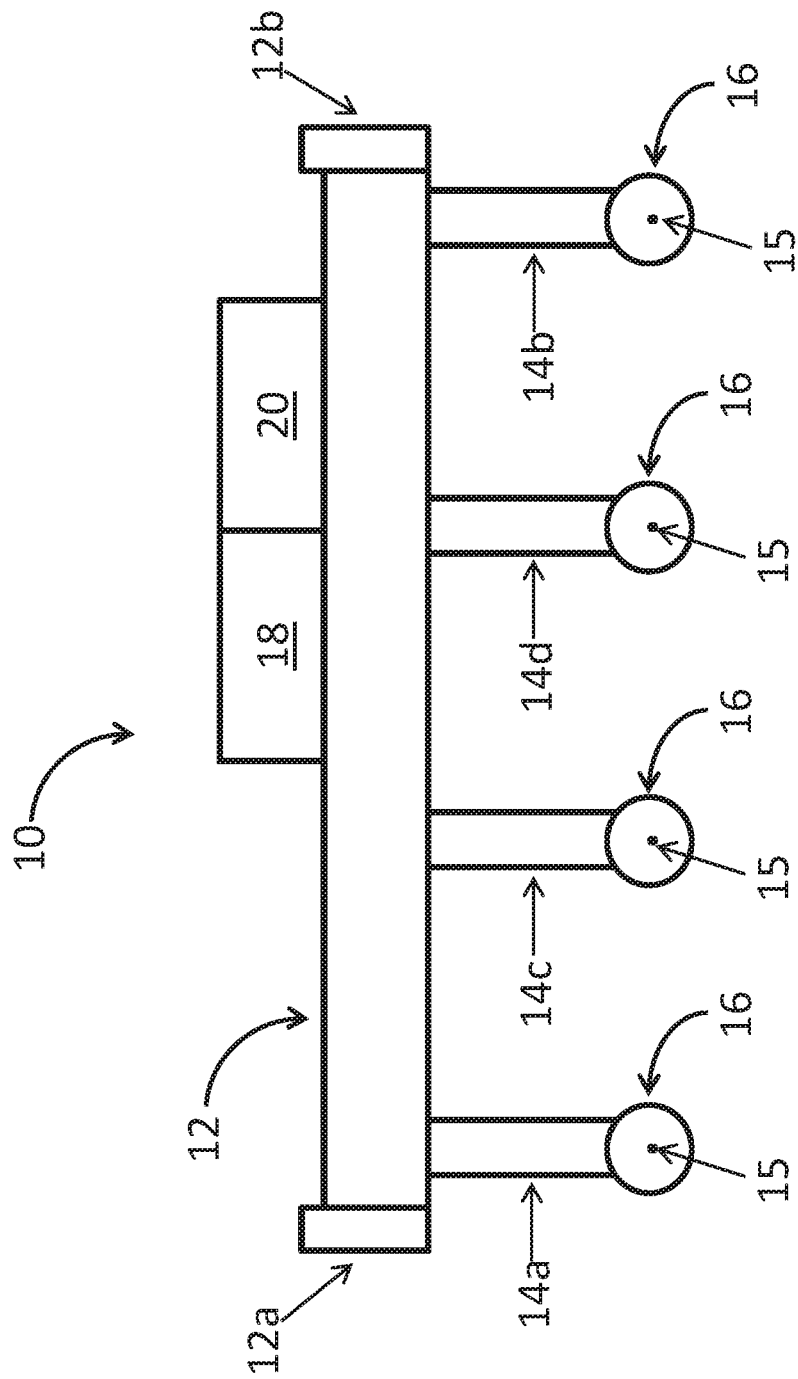

In accordance with the drawings illustrating at least one embodiment, as generally depicted in FIG. 1 through FIG. 7, a robotic system and/or method 10 is disclosed and described herein. The system comprises a movable and adjustable platform 12 capable of moving about and through a multi-level structure having stairs and steps (e.g., such as a house), wherein the horizontal orientation of the platform 12 is maintained as the vertical orientation of the individual legs (denoted by reference characters 14a-14d) are adjusted. In general, the system and/or method is guided by (i) a multi-planar lidar-based three-dimensional (3-D) data collection and analysis of the surrounding environment, (ii) a 3-D model program of the environment with continuous updates of the data via the lidar sensor(s), and (iii) additional sensors for horizontal impact, pressure, proximity, weight, turning, and tilt of the various components depending from the platform as disclosed in greater detail herein.

Figure 2:
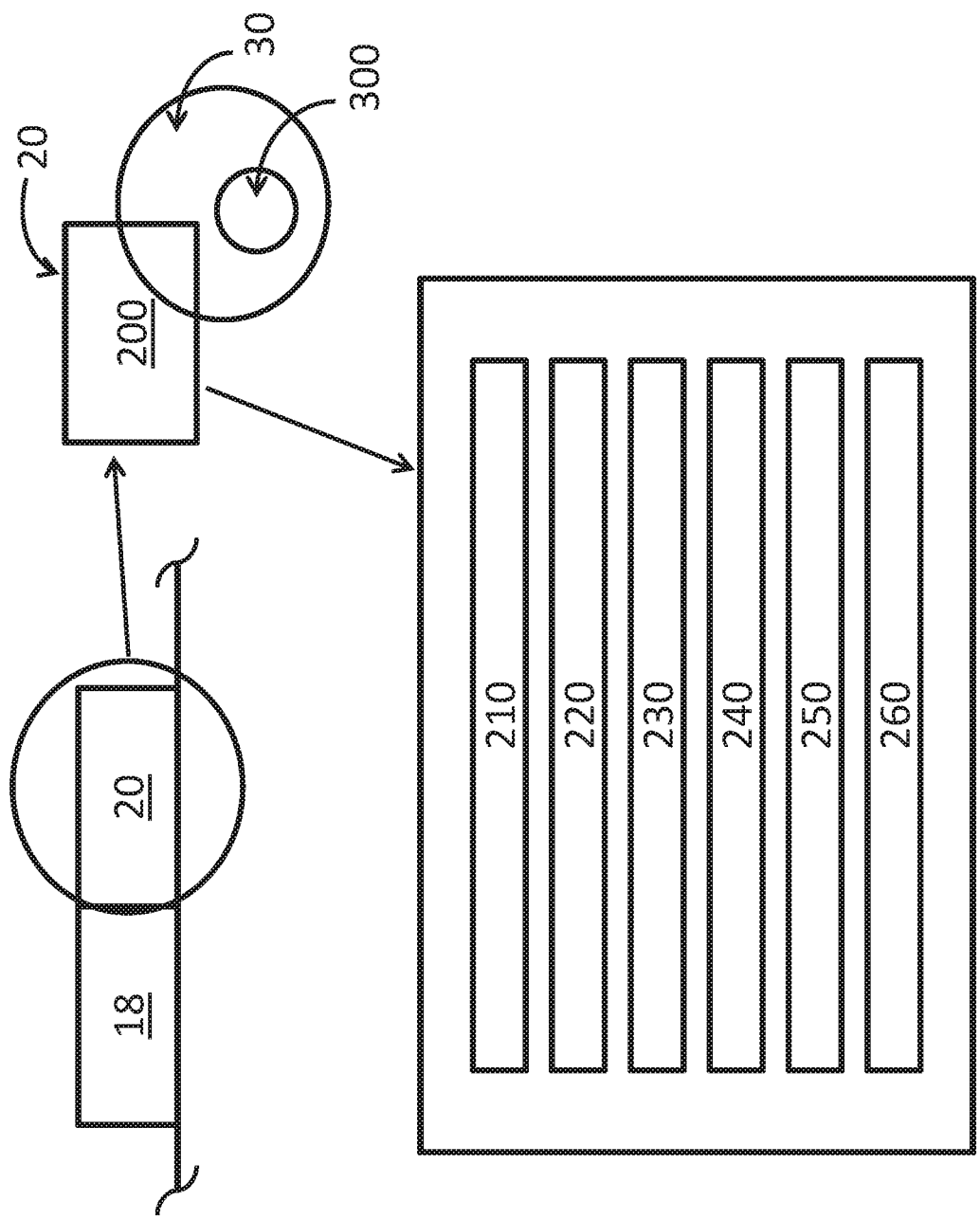

Generally, consistent with FIG. 1 and FIG. 2, the system and/or method comprises a platform 12, a plurality of legs 14a-14d depending from the platform 12 and terminating with wheels 16 on axes 15, and a plurality of electric motors 18 controlling the horizontal and vertical movement of the legs 14a-14d and wheels 16. The mobility mechanics of the system and/or method are controlled by a control unit 20 that includes a plurality of sensors 200 that communicate with and direct the electric motors 18.

The platform 12 comprises a planar form and accommodates a variety of components, elements, and/or attachments to depend therefrom along the top surface as well as accommodating the legs 14a-14d depending from the bottom surface thereof. The platform 12 includes a front bumper 12a and a rear bumper 12b. The platform 12 also comprises a minimum length equal to approximately twice the expected length of interior stair-steps (e.g., platform minimum length≥2×standard length of an interior step or stair landing).

The plurality of legs 14a-14d depend from the platform 12 wherein each leg 14a-14d can be either a single vertical support or a pair of vertical supports. For example, each leg 14a-14d may comprise a single vertical support, vertically adjustable or fixed, extended down from the imaginary line connecting centers of the front bumper 12a and the rear bumper 12b, and ending with a horizontal axis 15, either fixed in a position or turned by an electric motor 18, with a pair of mutually opposed wheels 16. In another example, each leg 14a-14d may comprise a member of a pair of vertical supports, vertically adjustable or fixed, extended down from the sides of the platform 12 symmetrically relative to the virtual line connecting centers of the front bumper 12a and the rear bumper 12b, each ending with a horizontal axis 15 (fixed or rotated by a motor 18) with one wheel 16 or cluster of wheels 16.

Figure 3:
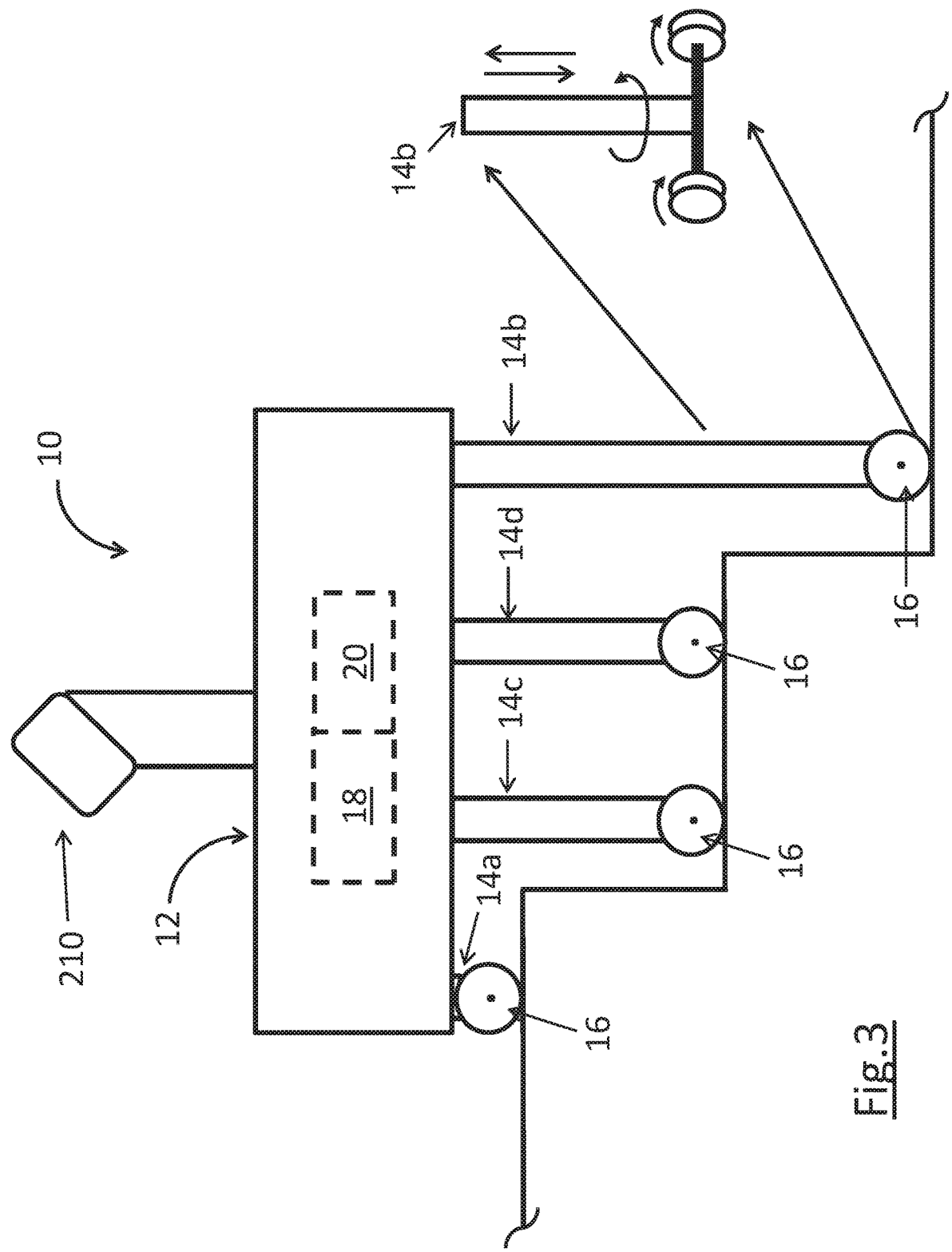

The plurality of legs may include a fixed, non-extensible leg 14a adjacent the front bumper 12a of the platform 12 and at least three vertically-extensible legs 14b, 14c, 14d, including leg 14b adjacent the rear bumper 12b of the platform 12. It is envisioned that several embodiments with varying quantities of legs, including or excluding of a non-extensible leg 14a, and individual wheels 16, or paired, mutually opposed wheels 16 on axes 15 may be provided without departing from the spirit and scope of the description provided herein, therefore, it is envisioned that the number of vertically-adjustable legs (K) will be determined by the formula/: K≥total number of legs−1. For example, as depicted in FIG. 3, the total number of legs=4, therefore, the number of vertically-adjustable legs (K)≥4−1, or 3 vertically-adjustable legs (as depicted). It is also envisioned that the maximum extension for the rear leg 14b must be greater than the maximum expected level change over the length of the platform 12.

The plurality of electric motors 18 control movement of the plurality of legs 14a-14d and wheels 16 as directed by the mobility mechanics of the system that include the control unit 20 and the plurality of sensors 200 in communication therewith. The mobility mechanics of the system and/or method include horizontal linear movement, horizontal turns, and vertical movement of the various legs 14a-14d and/or wheels 16. For example, the horizontal linear movement and/or the horizontal turns is/are achieved by the wheels 16 is powered by the motors 18 as controlled by the control unit 20 and the various sensors 200 incorporated therein. Vertically-adjustable positioning of the legs (and/or the individual legs comprising the plurality of legs 14a-14d) is/are achieved by the motors 18 as controlled by the control unit 20 and the sensors 200 incorporated therein.

To effectuate the communication of the data and information collected and analyzed within the system and/or method, a three-dimensional model program 30 derived from a movement algorithm 300 utilizing the plurality of sensors 200 is incorporated into the control unit 20.

The plurality of sensors 200 comprises a multi-planar lidar (light detection and ranging) 210 device disposed on the platform 12 in a manner to optimize light signal transmission and capture. The lidar provides a significant quantity of data and information for developing the mapping of the environment around the system and/or method.

The plurality of sensors 200 also includes a plurality of proximity sensors 220 disposed on the front bumper 12a, the rear bumper 12b, and the plurality of legs 14a-14d depending from the platform 12. The proximity sensors 220 provide a means for preventing inadvertent contact between the system and/or method and any structures, objects, and/or elements existing in the surrounding environment, and work with the lidar device 210 to navigate the environment with further reduced probability of damaging structures or objects in the environment of the system/method.

The plurality of sensors 200 also includes a plurality of weight sensors 230 disposed on the plurality of legs 14a-14d. The weight sensors 230 provide a means for detecting and/or measuring existence and type of contact made between the leg and the surface under it, including the fraction of the weight of platform 12 currently applied to it.

The plurality of sensors 200 also includes a plurality of turning sensors 240 disposed on the plurality of wheels 16. The turning sensors 240 provide a means for controlling the breadth and angle of turn applied to any wheel or cluster of wheels 16, in particular to contribute to detection of the movement of the entire platform 12 and to detect slippage of individual wheels 16.

The plurality of sensors 200 also includes a plurality of vertical positioning sensors 250 disposed on the plurality of legs 14. The vertical positioning sensors 250 provide a means for accurately determining and positioning the vertical adjustment applied to a selected leg within the plurality of legs 14a-14d.

The plurality of sensors 200 also includes a tilt sensor 260 disposed on the platform 12. The tilt sensor 260 provides a means for monitoring and preventing the platform 12 (and therefore the system/method) from being overturned and otherwise compromised or damaged and preventing such an accident from causing injury and/or damage to the people and/or objects/structures in the surrounding environment.

In operation, the control unit 20 receives and engages a 3-D model program 30 and a movement algorithm 300, which is influenced by the data and information collected, sorted, and analyzed by the plurality of sensors 200 arrayed along the system/method. The control unit 20 controls the system/method through building and continuously updating 3D-model of the environment using the collected and interpreted environmental data via 3-D model program 30, and also running the movement algorithm on the current 3-D model program 30 of the environment to control the electric motors 18 powering system mobility via signals communicated between the control unit 20 and the motors 18.

The 3-D model program 30 builds a continuously or frequently updated three-dimensional model of the environment, mapping and clarifying static (immobile) objects, then identifying dynamic (moving) objects, utilizing a multi-faceted process. For example, using a multi-planar lidar, the 3-D model program 30 collects a cloud of coordinates of located dots (relative to system apparatus) belonging to nearby objects' surfaces, such as floors, stairs, furniture, people or pets. The program 30 compares the cloud of relative coordinates of dots to the previously collected data, using statistical estimations and recent movement data, whereby the program derives its current coordinates and relates coordinates of dots to the previously located objects. Thereafter, the program 30 statistically determines whether coordinates interpreted as belonging to same objects as identified before statistically clarify static model of the environment. Coordinates statistically interpreted as contradicting to the static model of environment (for example, a chair is moved) update the static model of the environment. Coordinates statistically interpreted as new information are assigned to dynamic objects. Coordinates statistically interpreted as belonging to dynamic objects that have not moved over significant period of time change the status of an object to static.

The movement algorithm provides logic to allow fast, reliable movement of the system device over both flat and non-flat surfaces. For flat surfaces (e.g., floors), the system device moves like a regular cart, including moving forward or backward and turning without vertical adjustments, within boundaries of the 3-D model of the surrounding environment. For inclined surfaces (e.g. ramps), the system device moves like on flat surfaces except adjusting one or more legs vertically to keep itself as horizontal as possible, moving in a normal way (front side forward) going uphill and backs up (rear side forward) going downhill. For moderately uneven but overall flat or inclined surfaces (e.g., floors or ramps with wires or small objects on them), the system device moves like on a flat or inclined surface but adjusts the height of its legs according to the 3-D model of the environment.

For moving up a set of stairs, the system device can use either of two modes: crawling mode or fast mode. In a crawling mode (e.g., to robot depicted in FIG. 3 and FIG. 4 vacuuming the stairs), the system device would approach very close to a step using horizontal movement (based on the 3-D model of the environment and its front bumper pressure/proximity sensor), then move itself vertically up by adjusting down all legs except the front leg(s), and then moving horizontally forward/backward according to the 3-D model of the step (following the shape of the step). As soon as it reaches the edge of the step with at least one front wheel, it can accelerate advancing horizontally forward, moving the other legs up as directed by 3-D model of the environment and pausing horizontal movement if a leg bumps into a step earlier than expected. In the fast mode (e.g., for the robot depicted in FIG. 6 and FIG. 7), the algorithm is similar to the crawling mode but all the legs will be continuously adjusting in anticipation of touching the next step edge so long as enough of the legs below the front one have a contact with the surface keeping the center of gravity inside the support base of the wheels touching the surface (thus, the platform's trajectory will not follow the shape of the steps but will be closer to a straight line). For going downstairs, the system device will go backward and follow the algorithm similar to moving upstairs, but in a backward sequence and using the rear leg weight sensor to detect the situation of too deep of a step and then stopping the movement and marking the spot on its model as impassable.

Figure 4:
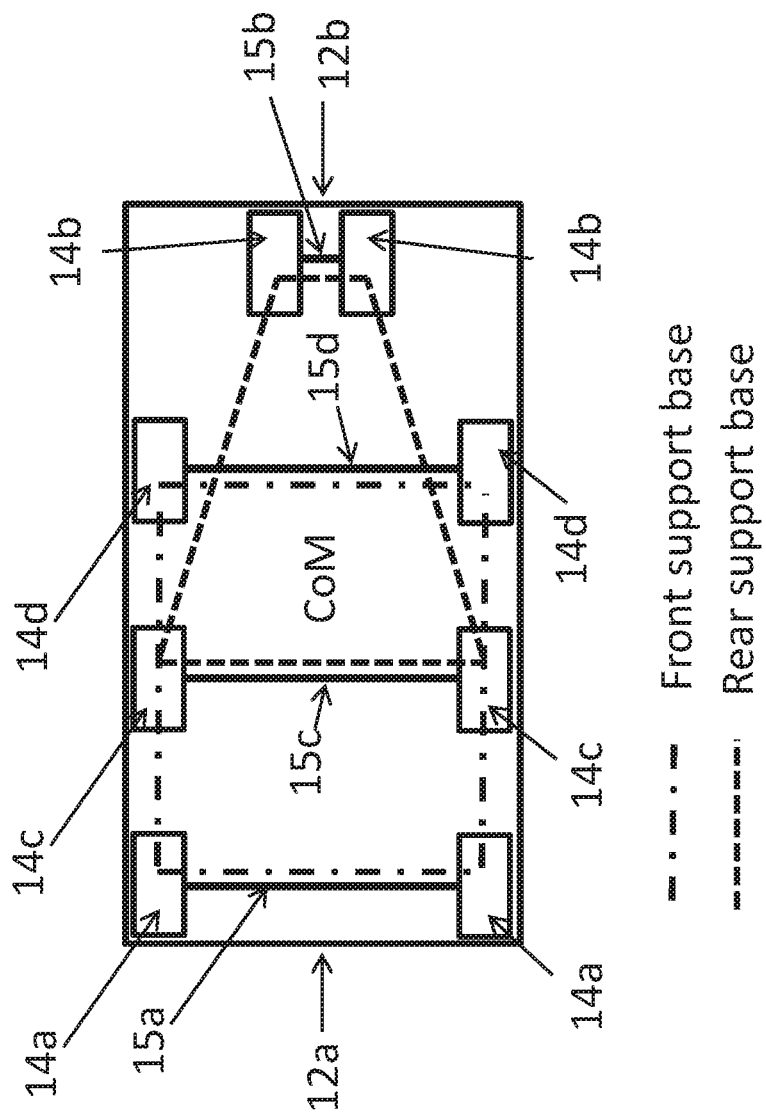
FIG. 4 is an underside view of FIG. 3.

As depicted in FIG. 3 and FIG. 4, one embodiment of the system and/or method 10 comprises a compact or miniaturized version of the general disclosure provided above, and consistent with the above description, the platform 12 comprises a planar form and accommodates a variety of components, elements, and/or attachments to depend therefrom along the top surface as well as accommodating the legs 14 depending from the bottom surface thereof. The platform 12 also includes a front bumper 12a and a rear bumper 12b. The platform 12 also comprises a minimum length equal to approximately twice the expected length of interior stair-steps (e.g., platform minimum length≥2×expected length of an interior step or stair landing).

As indicated above, the system and/or method 10 is guided by (i) a multi-planar lidar-based three-dimensional (3-D) data collection and analysis of the surrounding environment, (ii) a 3-D model of the environment with continuous or frequent updates of the data via the lidar sensor(s), and (iii) additional sensors for horizontal impact, pressure, proximity, weight, turning, and tilt of the various components depending from the platform as disclosed in greater detail herein.

In this embodiment, a plurality of legs 14a-14d depend from the platform 12, wherein each pair of legs moves together and is connected on the end with an axis 15 with a pair of mutually-opposed wheels 16. The plurality of legs 14a-14d comprise a fixed, non-extensible front pair of legs 14a adjacent the front bumper 12a of the platform 12, and at least one vertically-extensible rear pair of legs 14b adjacent the rear bumper 12b of the platform 12. Moreover, the plurality of legs 14 includes at least two pairs of vertically-extensible intermediate legs 14c and 14d disposed between the front leg 14a and the rear leg 14b.

A plurality of electric motors 18 controls the movement of the plurality of legs 14a-14d and wheels 16. The electric motors 18 and the control unit 20 work in cooperation to communicate signals from the motors to the various components for moving and/or adjusting the various components of the system device.

Consistent with FIG. 4, the platform 12 and the corresponding arrangement of the legs and wheels 16 form asymmetrical trapezoid shape when viewed above or below the platform 12. The trapezoid shape is achieved by the front pair of legs 14a aligned adjacent and substantially parallel the front edge of the platform 12 (that substantially corresponds to the front bumper 12a formed at the front of the platform 12) and with the intermediate pair of legs 14c and 14d similarly oriented to be substantially parallel to the alignment and orientation of the front pair of legs 14a. The distance between front pair of legs 14a and intermediate pair of legs 14c and the distance between intermediate pair of legs 14c and 14d are approximately equal. The layout of platform 12 should be designed so that the center of mass (CoM) disposed between axes 15c and 15d, as close to the center of a line connecting centers of axes 15c and 15d. The distance between the wheels 16 along each of the front and intermediate axes 15a, 15c, 15d are approximately equal and generally the same distance as the width of the platform 12.

The distance between the intermediate axis 15d and rear axis 15b is also approximately equal to the distances between the other axes 15a to 15c and 15c to 15d. However, the wheels 16 of rear axis 15b are in-set from the perimeter of the platform 12. The rear axis 15b is a short axis that functions as the steering axis for the system device 10.

As noted above, and consistent with the aforementioned disclosure, a three-dimensional model program and a movement algorithm utilizing a plurality of sensors collecting and processing data, the plurality of sensors 200 comprises a multi-planar lidar 210 disposed on the platform 12, a plurality of proximity sensors 220 disposed on the front bumper 12a, the rear bumper 12b, and the plurality of legs 14a-14d, a plurality of weight sensors 230 disposed on the plurality of legs 14a-14d, a plurality of turning sensors 240 disposed on the plurality of wheels 16, a plurality of vertical positioning sensors 250 disposed on the plurality of legs 14a-14d, and a tilt sensor 260 disposed on the platform 12.

As depicted in FIG. 3, the system device 10 is deployed along a set of interior stair-steps. The front pair of legs 14a is positioned on the top stair or landing with intermediate pair of legs 14c and 14d vertically adjusted substantially to a height equal to the height or rise of the stair-step so as to level the platform 12 in a manner consistent with the level of the front portion of the platform 12. The rear pair of legs 14b is vertically adjusted to a height substantially equal to the height of two stair-steps to balance and equalize the rear of the platform 12 relative to the front of the platform 12.

Figure 5:
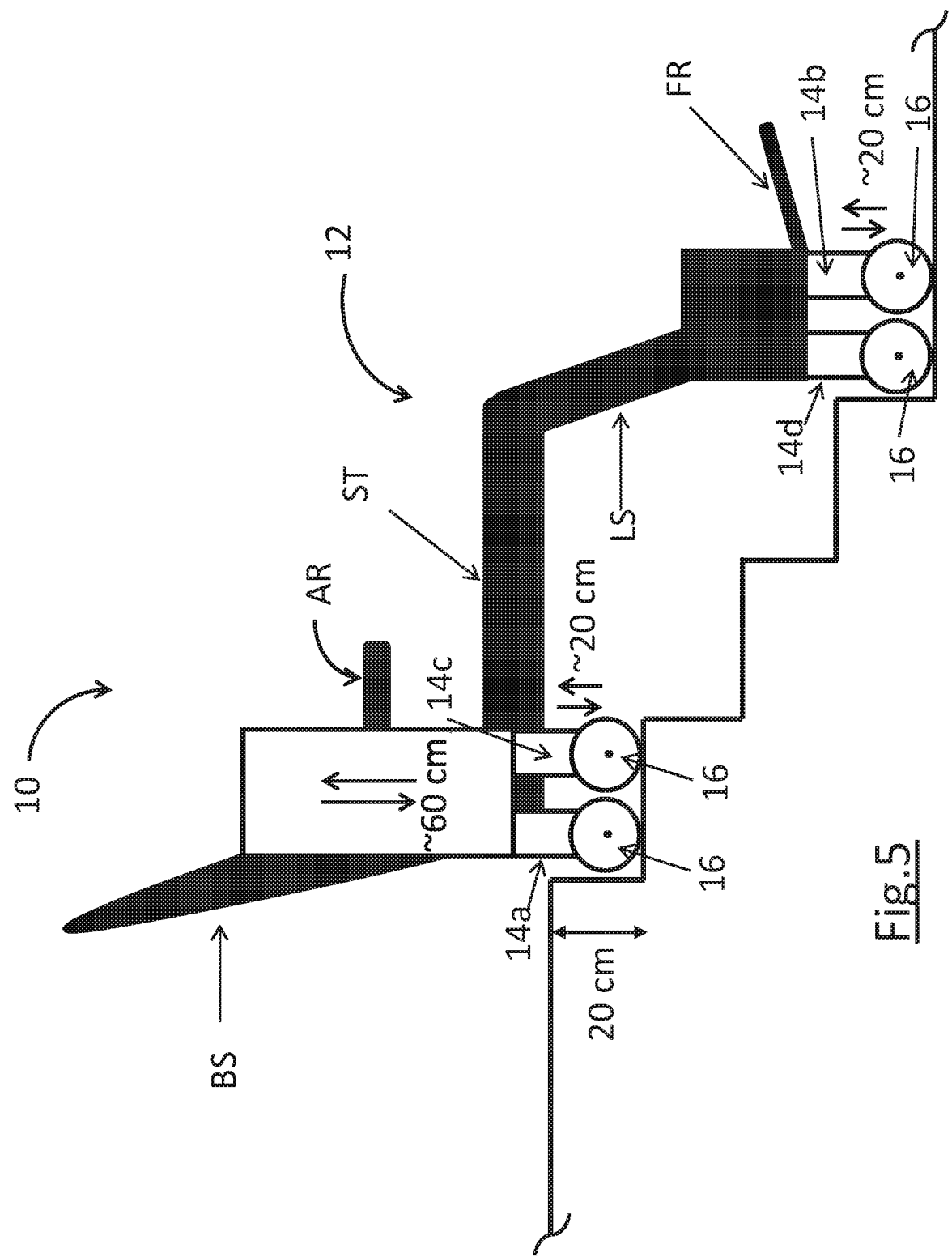
FIG. 5 is an illustration of a robotic device in the form a wheelchair for navigating stairs, in accordance to another embodiment of the present invention.

Consistent with FIG. 5, the system device 10 may comprise a wheelchair for use on stair-steps. In this embodiment, the platform 12 comprises a seat ST, a back-support BS upwardly depending from the seat ST, and a human leg support LS downwardly depending from the seat ST, and may also include a foot rest FR. This embodiment may also include at least one (and preferably a pair of) arm rest AR depending from the back-support BS. At the front of the platform 12, the front pair of legs 14a and the intermediate pair of legs 14c are oriented and aligned to be substantially parallel to the front edge of the platform 12, whereby the pair of legs 14a and 14c are disposed at a distance no greater than the expected length of single stair-step or landing. Similarly, at the rear of the platform 12, rear pair of legs 14b and intermediate pair of legs 14d are oriented and aligned to be substantially parallel to the rear edge of the platform, whereby the pair of legs 14b and 14d are disposed at a distance no greater than the expected length of a single stair step or landing. It is envisioned that the legs 14a and 14c will travel approximately 80 cm in a vertical direction and the legs 14b and 14d, respectively, will travel approximately 20 cm in a vertical direction, each traveling distance allowing the wheels 16 to navigate the next stair landing as the system device 10 is operated (as indicated and/or denoted by the directional arrows), whether the navigation is up or down the target stairs.

Figure 6:
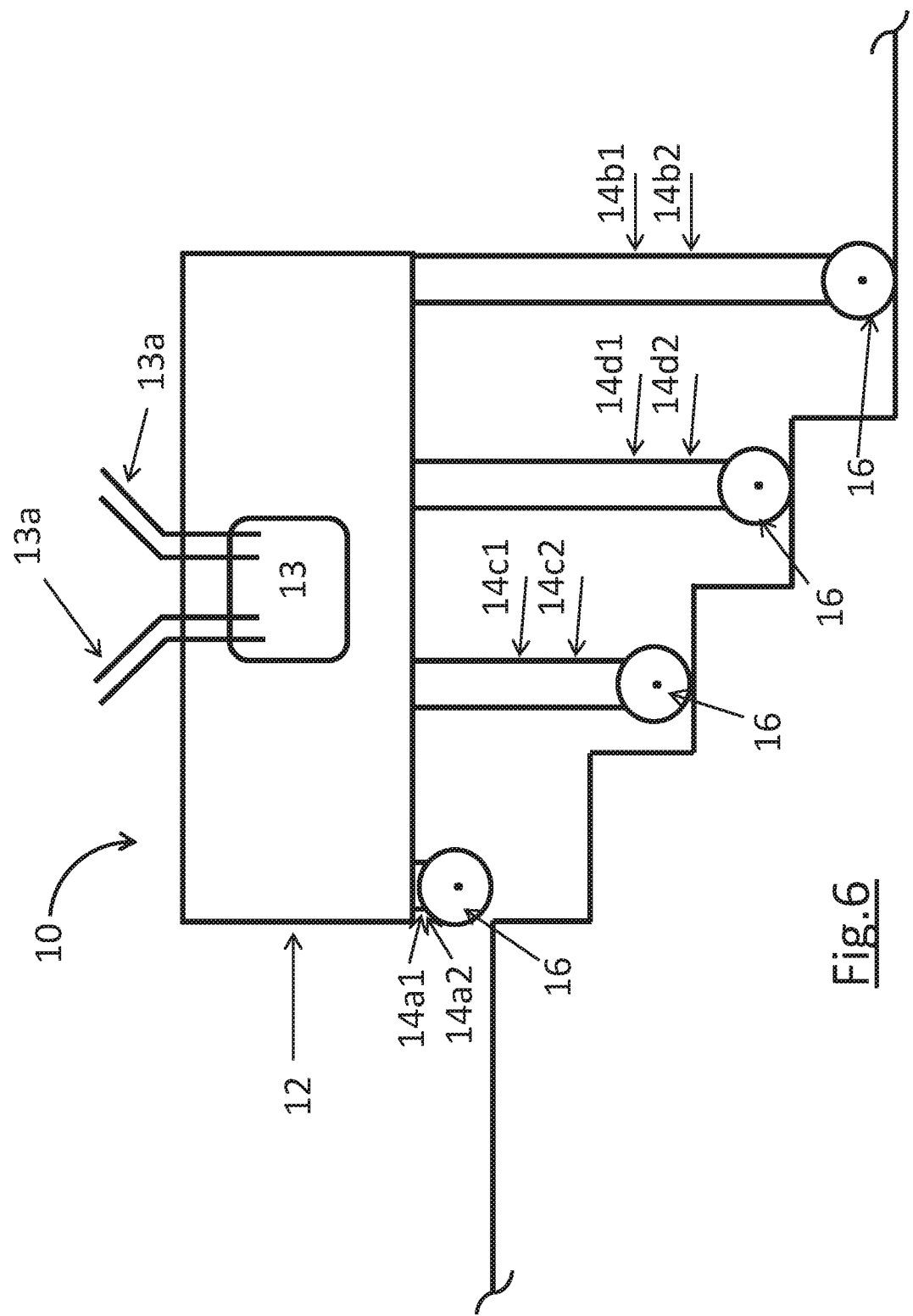
FIG. 6 is an illustration of a robotic device in the form of a rescue device that may include multiple arms and/or instruments.
Figure 7:
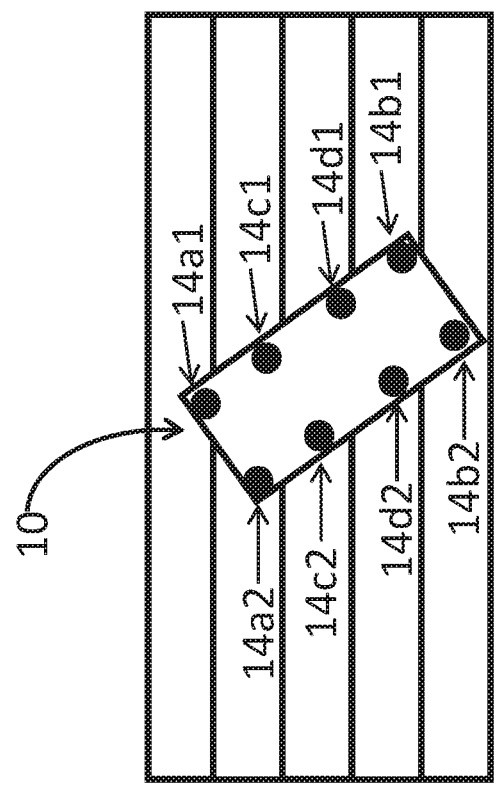
FIG. 7 is a top view of FIG. 6.

Consistent with FIG. 6 and FIG. 7, the system device 10 may be a rescue device and comprise a platform 12 having a console 13 disposed thereon having a plurality of arms 13a having multiple instruments incorporated therein. The arms and instruments are utilized for grasping, moving, removing, manipulating, collecting, and any other action that may be suitable for a rescue device. This embodiment includes eight individually adjustable legs 14 (front 14a1, 14a2 and rear 14b1, 14b2, and intermediate legs 14c1, 14c2 and 14d1, 14d2) at equidistant lengths apart from one another and oriented in pairs and in parallel orientation (14a1-14a2 parallel to 14b1-14b2, 14c1-14c2 and 14d1-14d2), which allows the system device to move not only up and down stairs, but also in any other direction). As deployed on the five stair-step depicted in the illustration, the leg 14a1 is deployed at approximately zero height; the legs 14a2 and 14c1 are vertically deployed at approximately one step height; the legs 14c2 and 14d1 are vertically deployed at approximately two step heights; the legs 14d2 and 14b1 are vertically deployed at approximately three-step heights, the leg 14b2 is vertically deployed at approximately four-step heights, thereby achieving level orientation of the platform 12 and the console 13 that the platform 12 supports.

It is to be understood that the embodiments and claims are not limited in application to the details of construction and arrangement of the components set forth in the description and/or illustrated in drawings. Rather, the description and/or the drawings provide examples of the embodiments envisioned, but the claims are not limited to any particular embodiment or a preferred embodiment disclosed and/or identified in the specification. Any drawing figures that may be provided are for illustrative purposes only, and merely provide practical examples of the invention disclosed herein. Therefore, any drawing figures provided should not be viewed as restricting the scope of the claims to what is depicted.

The embodiments and claims disclosed herein are further capable of other embodiments and of being practiced and carried out in various ways, including various combinations and sub-combinations of the features described above but that may not have been explicitly disclosed in specific combinations and sub-combinations.

Accordingly, those skilled in the art will appreciate that the conception upon which the embodiments and claims are based may be readily utilized as a basis for the design of other structures, methods, and systems. In addition, it is to be understood that the phraseology and terminology employed herein are for the purposes of description and should not be regarded as limiting the claims.

What is claimed is:

1. A robotic system comprising:
a platform having a minimum length equal to approximately twice an expected length of an interior stair-step, the platform having a front bumper and a rear bumper;
a plurality of pairs of legs depending from the platform wherein each pair of legs includes a pair of wheels;
a plurality of electric motors controlling movement of the plurality of legs and wheels; and
a three-dimensional model program and a movement algorithm utilizing a plurality of sensors collecting and processing data for controlling the movement of the platform, the plurality of sensors comprising:
a multi-planar lidar disposed on the platform;
a plurality of proximity sensors disposed on the front bumper, the rear bumper, and the plurality of legs;
a plurality of weight sensors disposed on the plurality of legs;
a plurality of turning sensors disposed on the plurality of wheels;
a plurality of vertical positioning sensors disposed on the plurality of legs; and
a tilt sensor disposed on the platform.

2. The system of claim 1, wherein the plurality of legs includes a fixed, non-extensible leg adjacent the front bumper of the platform and at least one vertically-extensible leg adjacent the rear bumper of the platform.

3. The system of claim 1, wherein the plurality of legs includes vertically-extensible legs.

4. The system of claim 1, wherein the plurality of pairs of legs depending from the platform and wherein each pair of legs includes a pair of wheels, the plurality of legs including a fixed, non-extensible leg adjacent the front bumper of the platform and at least one vertically-extensible leg adjacent the rear bumper of the platform.

5. The system of claim 1, wherein:
the platform having a length equal to approximately twice an expected length of an interior stair-step;
a plurality of pairs of legs depending from the platform wherein each pair of legs is connected on the end by an axis that includes mutually opposed wheels, the plurality of axes comprising:
a fixed pair of front legs adjacent the front bumper of the platform;
a vertically-extensible pair of rear legs adjacent the rear bumper of the platform; and
at least two vertically-extensible pairs of intermediate legs disposed between the front legs and the rear legs.

6. The system of claim 5, wherein the plurality of axes further comprises a vacuum cleaning device with the inlet aligned with the front bumper of the system to clean the surface the system covers while moving.

7. The system of claim 1, wherein the platform comprises:
a seat;
a back support upwardly depending from the seat, and
a leg support downwardly depending from the seat.

8. The system of claim 1, wherein the platform comprises a console disposed thereon having a plurality of arms having multiple instruments.

9. A robotic system comprising:
a platform having a length equal to approximately twice an expected length of an interior stair-step, the platform having a front bumper and a rear bumper;
a plurality of pairs of legs depending from the platform wherein each pair of legs includes a pair of wheels, the plurality of legs connected on the end by an axis that includes mutually opposed wheels, the plurality of axes comprising:
a fixed pair of front legs adjacent the front bumper of the platform;
a vertically-extensible pair of rear legs adjacent the rear bumper of the platform; and
at least two vertically-extensible pairs of intermediate legs disposed between the front legs and the rear legs;
a plurality of electric motors controlling movement of the plurality of legs and wheels; and
a three-dimensional model program and a movement algorithm utilizing a plurality of sensors collecting and processing data for controlling the movement of the platform, the plurality of sensors comprising:
a multi-planar lidar disposed on the platform;
a plurality of proximity sensors disposed on the front bumper, the rear bumper, and the plurality of legs;
a plurality of weight sensors disposed on the plurality of legs;
a plurality of turning sensors disposed on the plurality of wheels;
a plurality of vertical positioning sensors disposed on the plurality of legs; and
a tilt sensor disposed on the platform.

10. The system of claim 9, wherein the plurality of legs includes a fixed, non-extensible leg adjacent the front bumper of the platform and at least one vertically-extensible leg adjacent the rear bumper of the platform.

11. The system of claim 9, wherein the plurality of legs includes vertically-extensible legs.

12. The system of claim 9, wherein the plurality of pairs of legs depending from the platform and wherein each pair of legs includes a pair of wheels, the plurality of legs including a fixed, non-extensible leg adjacent the front bumper of the platform and at least one vertically-extensible leg adjacent the rear bumper of the platform.

13. The system of claim 9, wherein the plurality of axes further comprises a vacuum cleaning device with the inlet aligned with the front bumper of the system to clean the surface the system covers while moving.

14. The system of claim 9, wherein the platform comprises a console disposed thereon having a plurality of arms having multiple instruments.

* * * * *